(12) United States Patent
Busato

(10) Patent No.: US 8,998,601 B2
(45) Date of Patent: Apr. 7, 2015

(54) STEREOLITHOGRAPHY MACHINE

(75) Inventor: Renzo Busato, Marano Vicentino (IT)

(73) Assignee: DWS S.R.L., Zane' (VI) (IT)

( * ) Notice: Subject to any disclaimer, the term of this patent is extended or adjusted under 35 U.S.C. 154(b) by 109 days.

(21) Appl. No.: 13/265,929

(22) PCT Filed: May 16, 2011

(86) PCT No.: PCT/EP2011/057904
§ 371 (c)(1),
(2), (4) Date: Dec. 5, 2011

(87) PCT Pub. No.: WO2011/144580
PCT Pub. Date: Nov. 24, 2011

(65) Prior Publication Data
US 2013/0052292 A1  Feb. 28, 2013

(30) Foreign Application Priority Data
May 17, 2010  (IT) ............................ VI2010A000136

(51) Int. Cl.
*B29C 35/08*  (2006.01)
*B29C 67/00*  (2006.01)

(52) U.S. Cl.
CPC ......... *B29C 67/0066* (2013.01); *B29C 67/0085* (2013.01)

(58) Field of Classification Search
USPC ....................................................... 425/174.4
See application file for complete search history.

(56) References Cited

U.S. PATENT DOCUMENTS

2012/0195994 A1 *  8/2012  El-Siblani et al. ......... 425/174.4

FOREIGN PATENT DOCUMENTS

EP  0379068 A2  7/1990

* cited by examiner

*Primary Examiner* — Yogendra Gupta
*Assistant Examiner* — Robert J Grun
(74) *Attorney, Agent, or Firm* — Husch Blackwell LLP

(57) ABSTRACT

Stereolithography machine (1) comprising: a supporting frame (2); a tank (3) suited to contain a liquid substance; a supporting plate (4) associated with the supporting frame (2), suited to support the tank (3); a stopping unit (5) suited to firmly hold the tank (3) on the supporting plate (4) in a resting position; emitter means (6) suited to direct a predefined electromagnetic radiation (6a) towards the tank (3); a holding unit (7) of the tank (3) operatively associated with the supporting plate (4) through first actuator means (8) configured so as to move the tank (3) with respect to the supporting plate (4) according to a predefined trajectory of movement. The stopping unit (5) comprises second actuator means (17) that define for the stopping unit (5) an active configuration for holding the tank (3) and a rest configuration for releasing the tank (3).

15 Claims, 7 Drawing Sheets

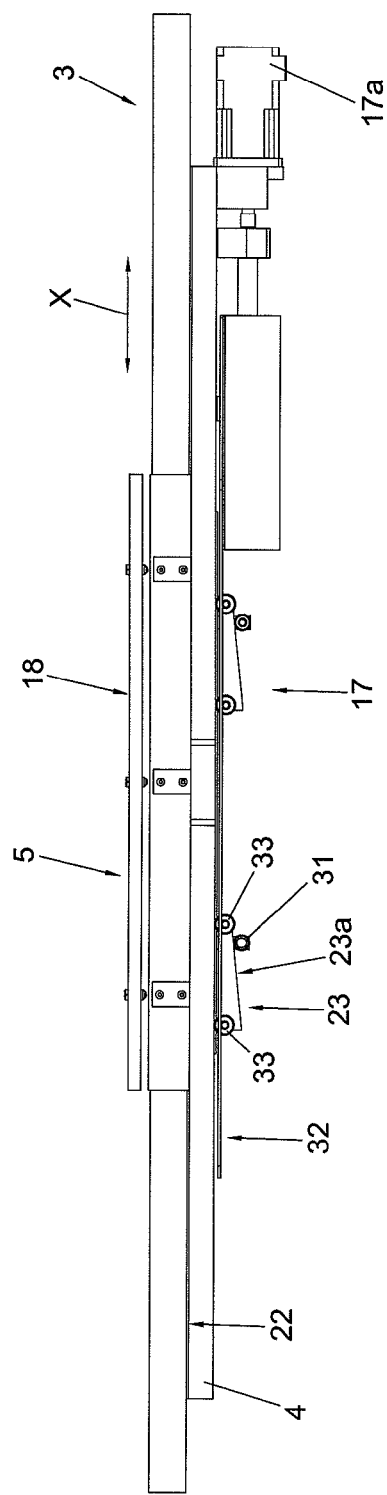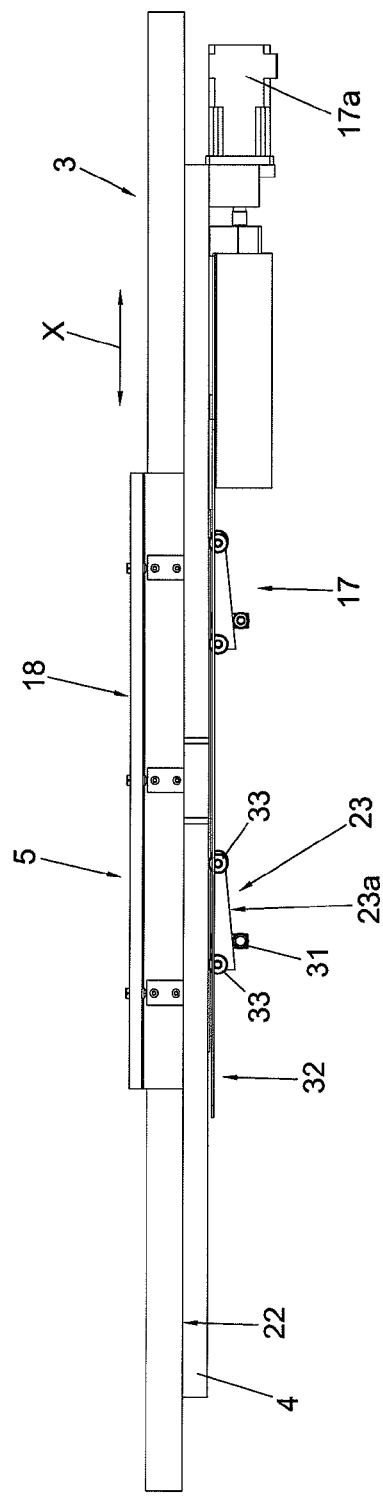

ly, such as a filling unit for the tank, not illustrated in the figures, since it is of known type.

STEREOLITHOGRAPHY MACHINE

FIELD OF THE INVENTION

The present invention concerns a stereolithography machine for the production of three-dimensional objects through solidification of a liquid substance.

BACKGROUND OF THE INVENTION

As is known, the stereolithography technique allows a three-dimensional object to be produced by superimposing a plurality of layers obtained from a substance that was initially liquid.

Each layer of the three-dimensional object is obtained by exposing a corresponding layer of the above mentioned liquid substance to suitable electromagnetic stimulation that causes it to be selectively solidified through polymerization in the areas corresponding to the object to be obtained.

According to a known embodiment, the above mentioned technique is implemented by means of stereolithography machines generally comprising a tank suited to contain a light-sensitive liquid resin, associated with a supporting plate.

The machine also comprises an emitter suited to direct a light beam towards the tank in order to solidify a layer of light-sensitive resin in the way previously described.

The three-dimensional object that is being produced is supported by a modelling plate facing the tank and motor-driven in the orthogonal direction with respect to the surface of the tank.

After solidification of each layer of the object, the modelling plate is moved with respect to the tank, so as to allow the formation of a new layer of liquid resin and, therefore, the formation of a new layer of the object in contact with the previously solidified layer.

According to a known technique, each layer of the three-dimensional object is formed through solidification of the resin layer adjacent to the bottom of the tank.

This is obtained by emitting a light beam under the tank, which is transparent, and making a through opening in the supporting plate, said through opening leaving an area of the bottom of the tank exposed to the action of the light beam.

This technique poses the drawback that the resin that is solidified tends to adhere to the bottom of the tank, thus making it difficult to successively lift the object.

In order to overcome the above mentioned drawback, the bottom of the tank is covered with silicone or another analogous material, which facilitates the detachment of the solidified resin.

However, the covering layers of known type pose the drawback that they progressively tend to become opaque due to exposure to light.

Once the covering layer has become opaque, it is necessary to replace the tank, which therefore is a separate component that is associated with the supporting plate through a stopping unit, which makes it possible to lock the tank firmly on the supporting plate but also to remove it when it wears out.

In particular, the stopping unit must maintain the bottom of the tank perfectly resting on the supporting plate, so as to guarantee its correct positioning and allow solidified layers with uniform thickness to be obtained.

The requisite that has just been mentioned is necessary also to prevent the tank from being lifted together with the modelling plate when this is lifted at the end of the solidification of each layer, due to the so-called "suction effect" resulting from the viscosity of the resin that keeps the last solidified layer adherent to the bottom of the tank.

The stereolithography machines of known type described above however pose the drawback that they require frequent replacements of the tank, in some cases even after each single processing cycle.

Obviously, changing the tank frequently means causing an additional cost that affects the final cost of the three-dimensional object.

Furthermore, the tank's limited duration is reflected on the maximum number of layers of each three-dimensional object and thus on the maximum height that can be obtained for the object.

According to a different known construction form, described in the European Patent application EP 0 379 068, the tank is moved with respect to the plate by means of a motor, so as to prevent the light beam from concentrating on a limited area of the tank, so as to slow down the process that makes it become opaque.

The tank comprises a flange interposed between a pair of thrust bearings, which allow the horizontal movement of the tank while preventing its vertical movement.

This system poses the drawback that the control of the position of the tank with respect to the supporting plate depends on the motor, which however is not capable of maintaining the tank in a stable position in case, for example, of impacts or vibrations during the construction process of the object.

Furthermore, the removal of the tank from the supporting plate requires the disassembly of a part of the machine, which makes the replacement of the tank rather complicated.

BRIEF SUMMARY OF THE INVENTION

The present invention aims to overcome all the drawbacks described above, which are typical of the stereolithography machines of known type.

In particular, it is the object of the present invention to provide a stereolithography machine that makes it possible to increase the duration of the tank compared to the machines of known type, maintaining the same geometry of the three-dimensional object produced.

It is also the object of the invention to make it possible to produce three-dimensional objects whose height exceeds the height that can be obtained with the machines of known type.

It is a further object of the invention to guarantee the stable positioning of the tank on the supporting plate.

It is another, yet not the least object of the invention to facilitate the removal of the tank for replacement, if necessary.

The above mentioned objects are achieved by a stereolithography machine constructed according to the main claim.

Further characteristics and details of the invention are described in the corresponding dependent claims.

Advantageously, a longer duration of the tank makes it possible to use the same tank to carry out more processing cycles compared to the machines of known type.

Therefore, advantageously, it is possible to distribute the cost of each tank on a larger number of three-dimensional objects, thus reducing their cost.

Still advantageously, the possibility to produce higher three-dimensional objects makes the machine of the invention more versatile than the machines of known type.

BRIEF DESCRIPTION OF THE DRAWINGS

The said objects and advantages, together with others which will be highlighted below, are illustrated in the description of a preferred embodiment of the invention which is provided by way of non-limiting example with reference to the attached drawings, wherein:

FIGS. 7 and 8 show a side view of two different operating configurations of the part of the stereolithography machine shown in FIG. 6.

DETAILED DESCRIPTION OF THE INVENTION

Figure 1:
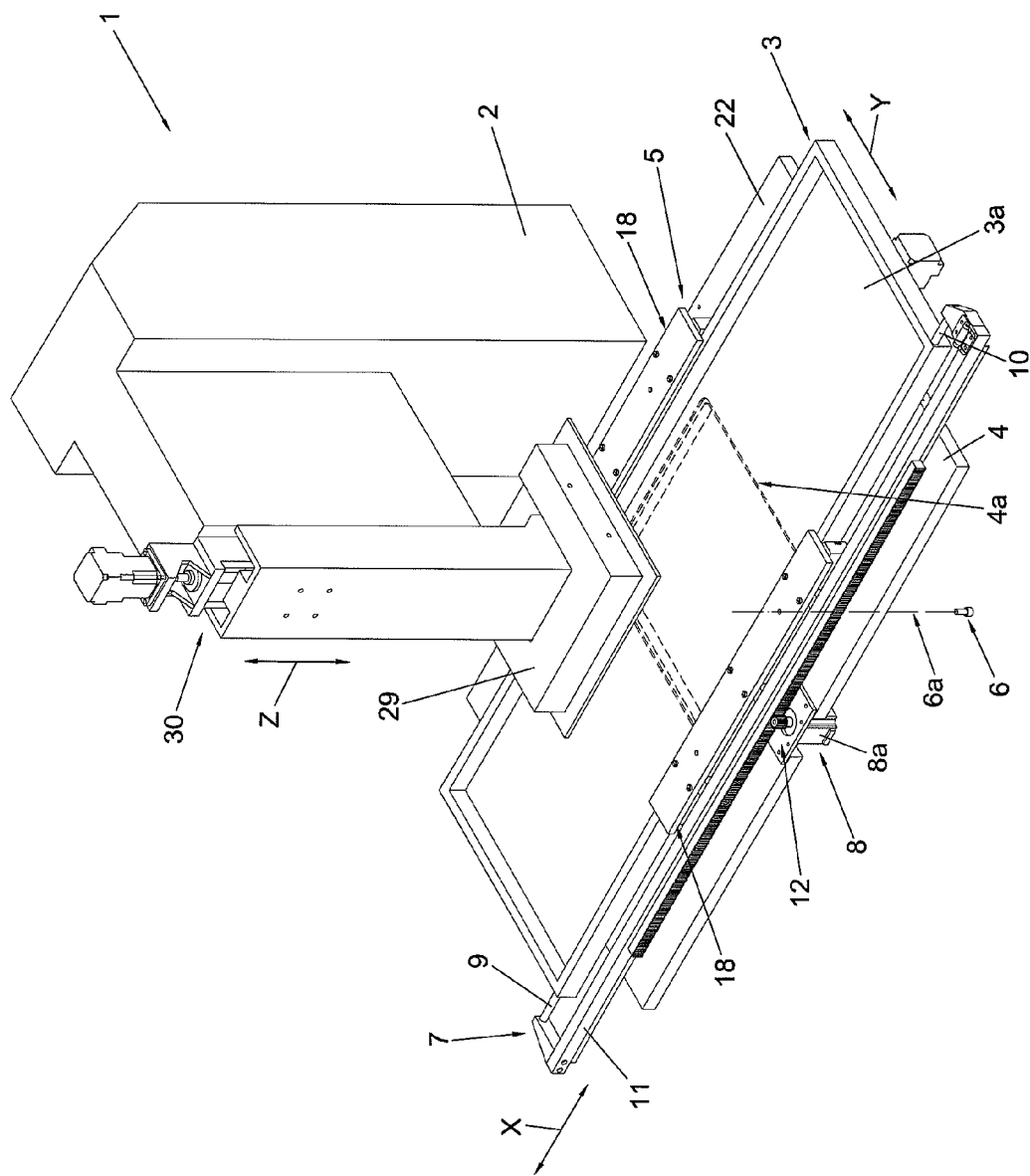
FIG. 1 shows an axonometric view of the stereolithography machine that is the subject of the invention.

The stereolithography machine that is the subject of the invention, indicated as a whole by 1 in FIG. 1, comprises a supporting frame 2 associated with a supporting plate 4 that supports a tank 3 suited to contain a liquid substance.

The stereolithography machine 1 also comprises a stopping unit 5 suited to lock the tank 3 on the supporting plate 4 so as to define at least one firm resting position of the tank 3.

Emitter means 6 are also provided, which are suited to direct a predefined electromagnetic radiation 6a towards the tank 3 when this is arranged in the above mentioned firm resting position, so as to obtain the selective solidification of the liquid substance.

Preferably but not necessarily, said liquid substance is a light-sensitive resin suited to polymerize when stimulated by light radiation and the predefined electromagnetic radiation 6a is a laser light beam.

The invention is particularly suitable for a stereolithography machine 1 where the layer of resin adjacent to the bottom 3a of the tank 3 is subjected to stimulation.

In this case, the bottom 3a of the tank 3 is transparent to electromagnetic radiation and the supporting plate 4 is provided with a through opening 4a, facing the bottom 3a at least when the tank 3 is arranged in the above mentioned firm resting position, through which the electromagnetic radiation can reach the bottom 3a.

The stereolithography machine 1 also comprises a modelling plate 29 suited to support the three-dimensional object being processed, which is not represented in the drawings.

Said modelling plate 29 faces the supporting plate 4 and is associated with the frame 2 through power means 30 suited to move the modelling plate 29 according to a movement direction Z orthogonal to the supporting plate 4.

Furthermore, the stereolithography machine 1 comprises a holding unit 7 operatively associated with the supporting plate 4 through first actuator means 8.

The holding unit 7 and the first actuator means 8 are configured so as to move the tank 3 with respect to the supporting plate 4 according to a predefined movement trajectory.

Said movement makes it possible to move the tank 3 with respect to the operating area of the emitter means 6, which substantially corresponds to the extension of the through opening 4a of the supporting plate 4.

Advantageously, the above mentioned movement makes it possible to use a larger tank 3 compared to the operating area of the emitter means 6, which can be moved after completing each individual layer of the three-dimensional object, in such a way as to distribute the effects of the electromagnetic radiation on a surface that is larger than the bottom 3a of the tank 3.

Consequently, the movement of the tank 3 makes it possible to increase the number of exposures that cause the bottom 3a to become completely opaque, thus achieving the object of increasing the duration of the tank compared to the duration achievable with the stereolithography machines of known type.

Advantageously, the above mentioned object is achieved with no need to extend the operating area of the emitter means 6, thus limiting the overall dimensions of the stereolithography machine 1 and its cost.

Furthermore, the possibility to use the same tank 3 for a larger number of exposures makes it possible to produce three-dimensional objects that are constituted by a larger number of layers, that is, objects that are higher than allowed by the machines of known type, thus achieving another object of the invention.

The holding unit 7 and the corresponding first actuator means 8 are preferably but not necessarily configured so as to be able to generate a translation of the tank 3 according to a first direction of movement X.

In particular, the holding unit 7 preferably comprises two contact elements 9 and 10 opposing each other, each one of which is arranged against a corresponding side wall of the tank 3 when this is arranged so that it rests on the supporting plate 4 and the alignment of which defines the above mentioned first direction of movement X.

Preferably but not necessarily, the distance between the two contact elements 9 and 10 is equal to the length of the tank 3, so as to obtain a precise movement of the latter in both senses of the first direction of movement X.

The contact elements 9 and 10 are preferably associated with the corresponding ends of a rod 11 slidingly connected to the frame 2 of the stereolithography machine 1 according to the above mentioned first direction of movement X.

This makes it possible to use a single actuator to move both the contact elements 9 and 10, to the advantage of the construction simplicity of the stereolithography machine 1.

Obviously, in variant embodiments of the invention the two contact elements 9 and 10 can be moved independently of each other.

Preferably but not necessarily, the above mentioned motor 8a is operatively associated with the rod 11 through a rack gear 12 that allows a precise movement in both senses of the first direction of movement X.

The contact element 10 is preferably hinged to the corresponding end of the rod 11 so that it can rotate and thus release the tank 3 and allow it to be easily removed by making it slide along the first direction of movement X.

In variant embodiments of the invention, not illustrated herein, the holding unit 7 and the corresponding first actuator means 8 are configured so as to be able to translate the tank 3 also according to a second direction of movement incident on said first direction of movement X.

Advantageously, a combination of translation movements of the tank 3 according to the above mentioned two directions of movement makes it possible to increase the dimensions of the tank, further increasing its duration.

Obviously, the translation movements according to the two above mentioned directions of movement can take place both simultaneously and consecutively, as preferred by the manufacturer.

It is also evident that in further variant embodiments not illustrated herein the holding unit 7 and the first actuator means 8 can be configured so as to perform also a rotation of the tank 3 in addition to the above mentioned translation movements.

Figure 2:
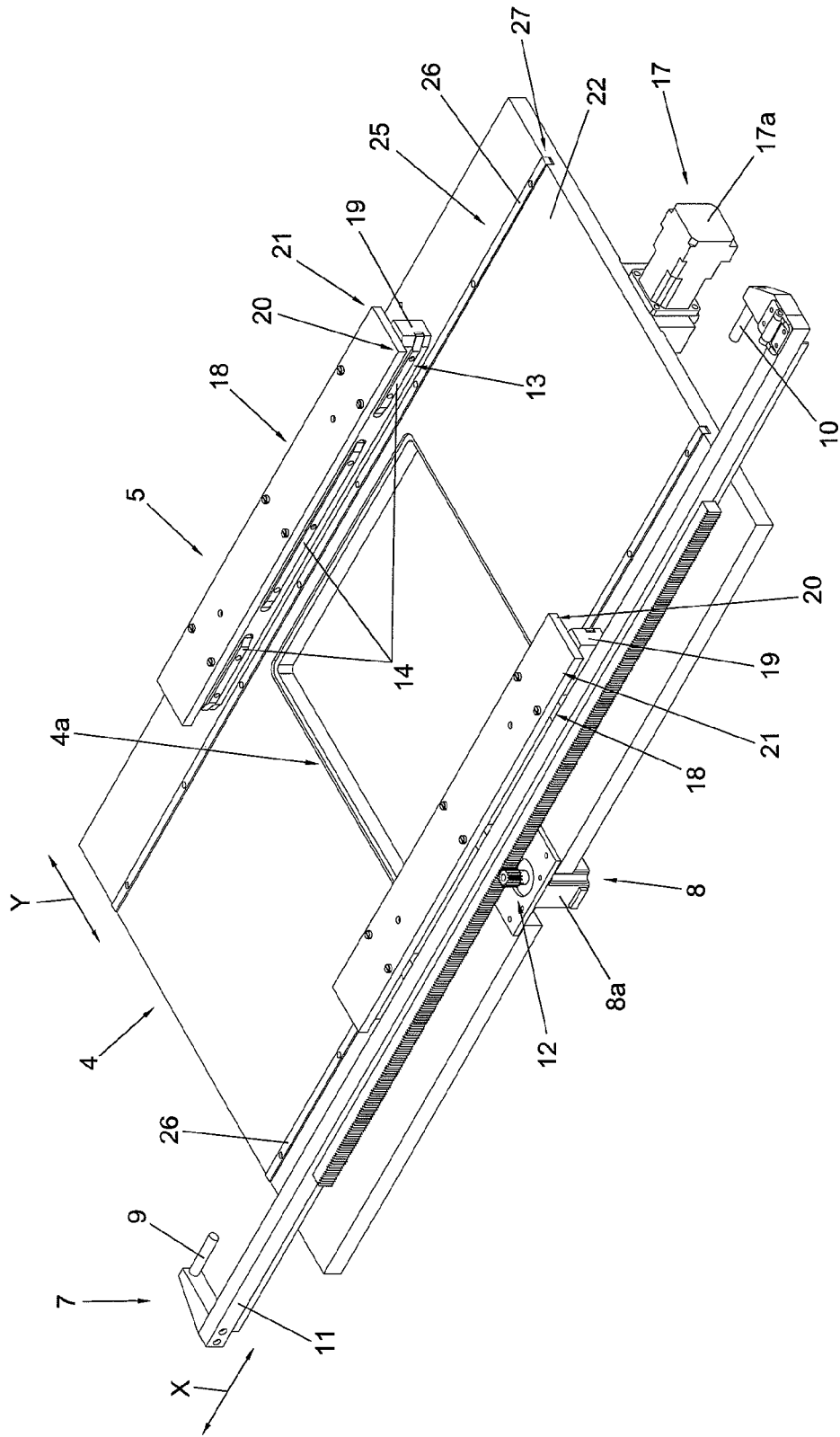
FIG. 2 shows a partial axonometric view of the stereolithography machine shown in FIG. 1.

Preferably and as shown in FIG. 2, where the frame 2 and the tank 3 are not illustrated for the sake of clarity, the supporting plate 4 comprises guide means 13 that counteract the movement of the tank 3 in a guide direction Y parallel to the supporting plate 4 and orthogonal to the above mentioned first direction of movement X.

Advantageously, the guide means 13 make it possible to maintain the tank 3 constantly aligned in the first direction of movement X while it is moved by the holding unit 7.

Figure 3:
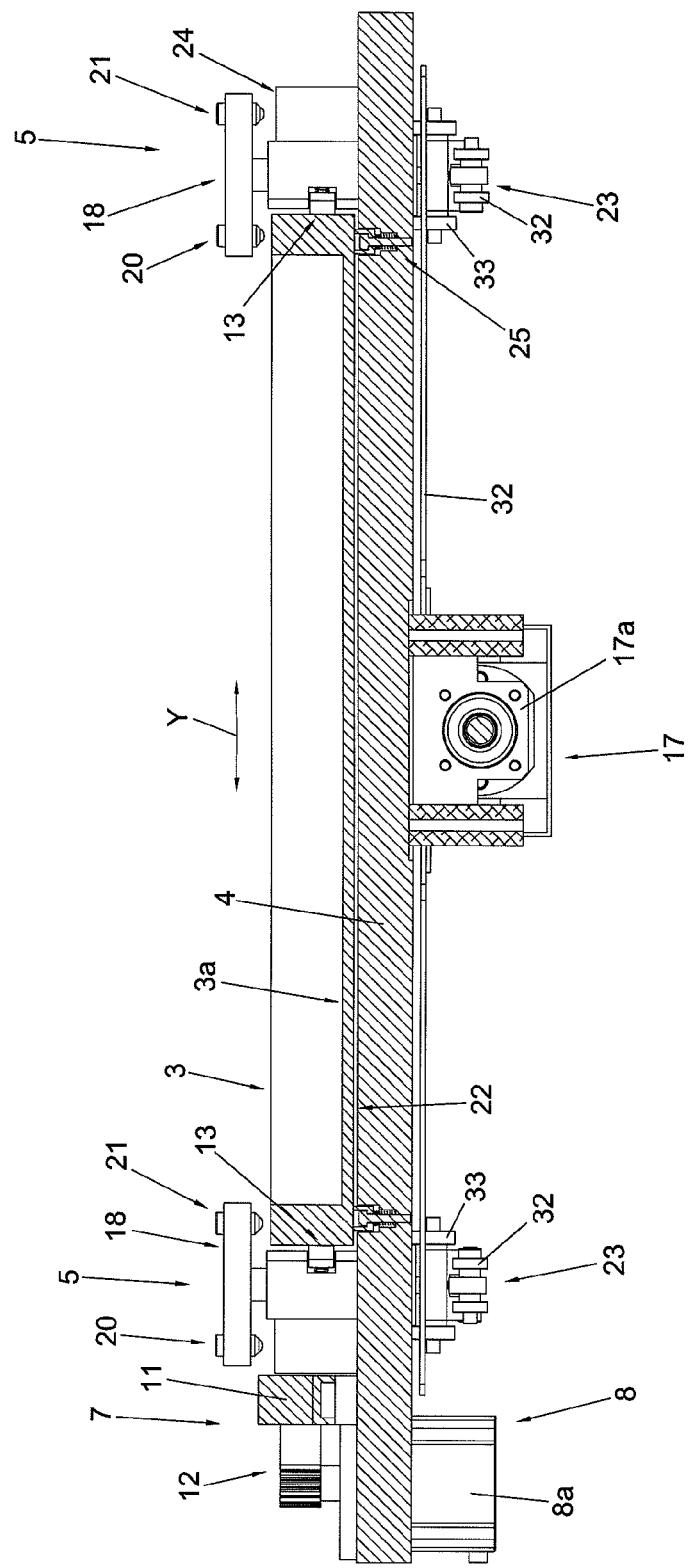
FIG. 3 shows a partial section view of the machine shown in FIG. 1.
Figure 4:
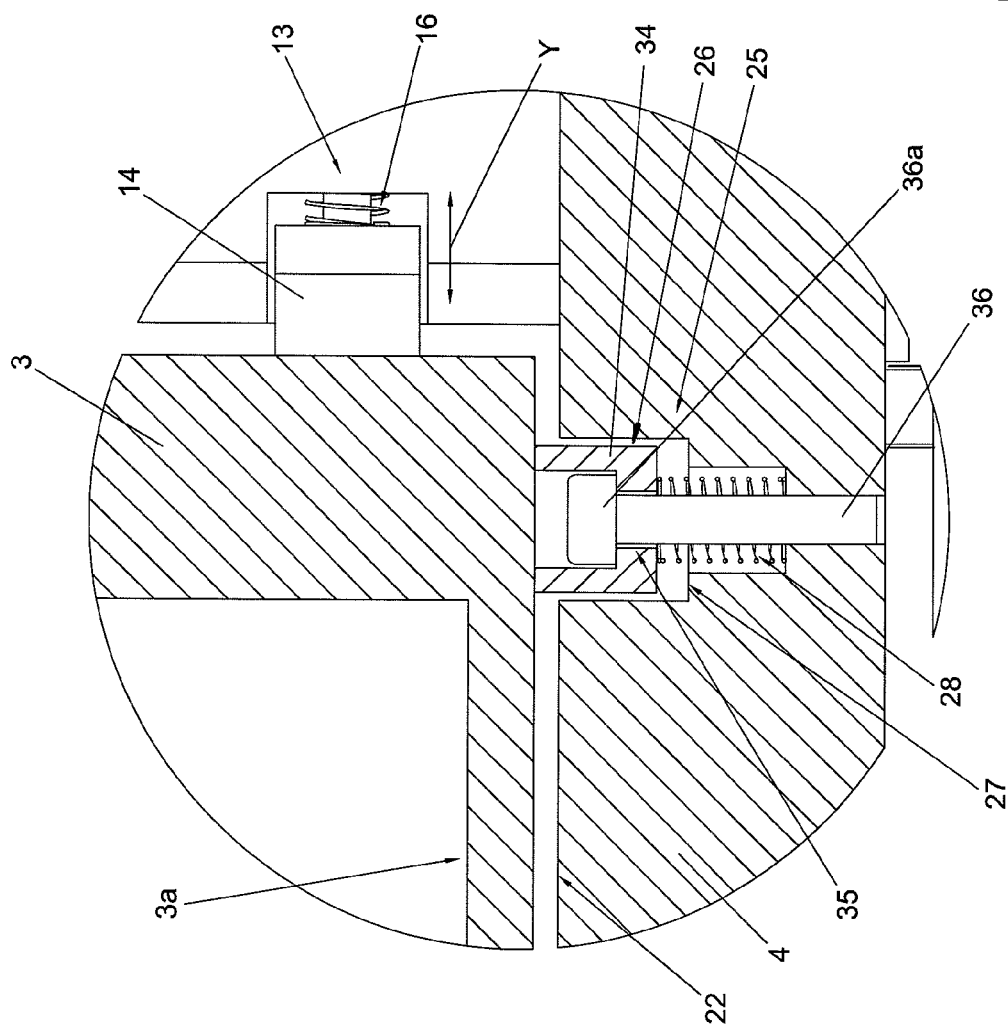
FIG. 4 shows an enlarged detail of FIG. 3.

Preferably, and as shown in FIG. 3 and in greater detail in FIG. 4, the above mentioned guide means 13 comprise counteracting bodies 14, each one of which is movably associated with the supporting plate 4 through elastic means 16 acting according to the above mentioned guide direction Y so as to maintain the corresponding counteracting body 14 constantly against a corresponding wall of the tank 3.

The counteracting bodies 14 can be present in any number and any arrangement but they are preferably arranged in pairs against corresponding opposing walls of the tank 3.

Regarding the stopping unit 5, it comprises second actuator means 17 that define for the stopping unit 5 an active configuration, in which the tank 3 is locked with respect to the supporting plate 4, and a rest configuration, in which the tank 3 is released so as to allow the holding unit 7 to move it to a new position.

Preferably, and as shown in FIG. 3, the stopping unit 5 comprises two pressor elements 18 arranged in proximity to two corresponding sides of the tank 3, which are illustrated herein in the rest configuration, as is evident because the pressor elements 18 are raised.

Figure 5:
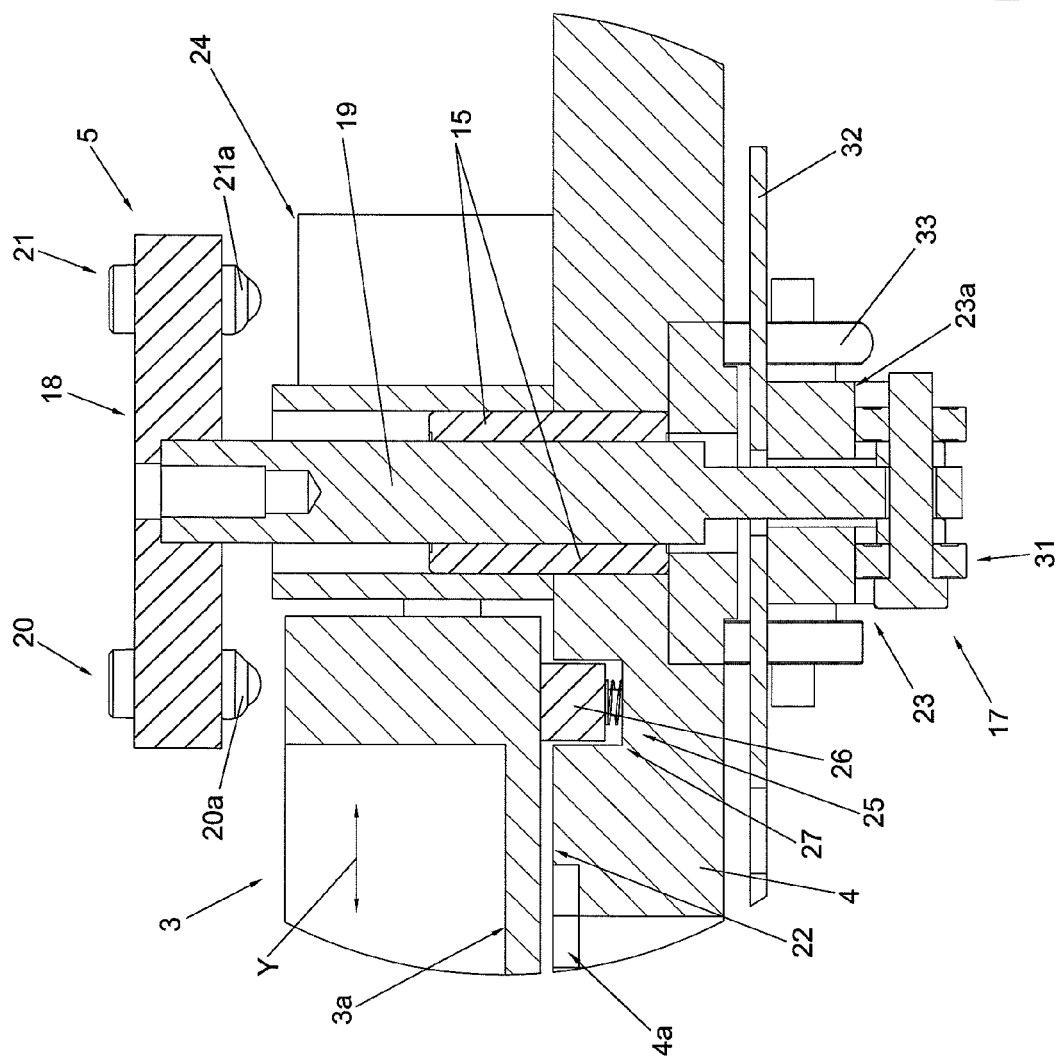
FIG. 5 shows a cross section of a detail of the machine shown in FIG. 1.

As shown in greater detail in FIG. 5, each pressor element 18 is slidingly associated with the supporting plate 4 and cooperates with a counteracting surface 22 associated with the supporting plate 4 in order to lock the tank 3 on opposing walls.

Each pressor element 18 preferably comprises a supporting body 19 developed orthogonally to the supporting plate 4, to which it is associated through sliding guides 15.

Figure 6:
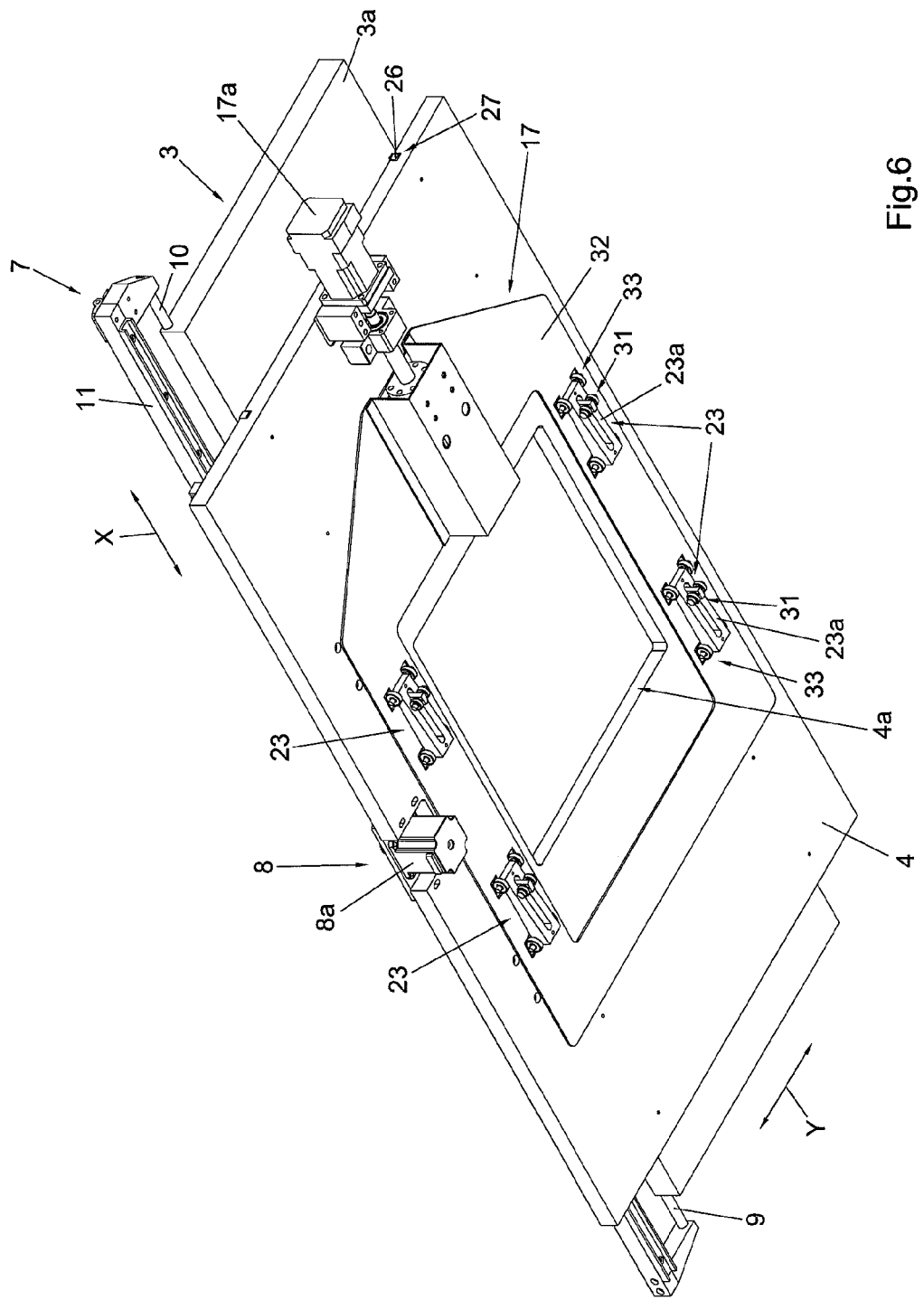
FIG. 6 shows a different partial axonometric view of the stereolithography machine shown in FIG. 1.

The structure of the second actuator means 17 for the movement of the pressor elements 18 can be observed in FIG. 6, where the frame 2 is not represented for the sake of clarity.

The second actuator means 17 comprise sliding blocks 23 that are motor driven in an operative direction parallel to the supporting plate 4, preferably but not necessarily parallel to the sliding direction X.

Each sliding block 23 is provided with a surface 23a inclined with respect to the supporting plate 4 and slidingly associated with one end of a corresponding supporting body 19, preferably through the interposition of a rolling bearing 31.

Each supporting body 19 preferably slides in a centre slot of the corresponding sliding block 23, advantageously making it possible to maintain the sliding block 23 aligned with the supporting body 19.

It is clear that the movement of the sliding block 23 according to the corresponding operative direction causes a movement of the pressor element 18 according to a sliding direction that is perpendicular to the supporting plate 4.

The movement of the sliding blocks 23 from the rest position, represented in FIG. 7, towards the active position, represented in FIG. 8, causes the pressor elements 18 to approach the tank 3, until the latter is pressed against the counteracting surface 22 that, in the variant embodiment just described, corresponds to the surface of the supporting plate 4, so as to lock the tank 3.

Preferably, each pressor element 18 is operatively connected to two sliding blocks 23, arranged at each end of the pressor element 18.

Advantageously, controlling each pressor element 18 through two sliding blocks 23 makes it possible to obtain a uniform action of the pressor element 18 for its entire length.

Furthermore, preferably and as shown always in FIG. 6, all of the sliding blocks 23 are associated with a single driving plate 32, which can slide on the lower surface of the supporting plate 4 through the interposition of rolling bearings 33 and is moved by a single motor 17a.

Advantageously, the fact that all of the sliding blocks 23 are powered simultaneously makes it possible to obtain their synchronized movement, and therefore a homogeneous compression action on the entire edge of the tank 3, thus preventing the latter from moving or becoming deformed during the compression stage.

Still advantageously, the stopping unit 5 described above is very compact and makes it possible to limit the overall dimensions of the stereolithography machine 1, above all in the lower area of the supporting plate 4, where also the emitter means 6 are located.

Furthermore, the use of a mechanical system to move the pressor elements 18 makes it possible to avoid the use of hydraulic or pneumatic devices that make construction more complicated.

Still advantageously, the sliding blocks 23 make it possible to obtain a gradual movement, different from the movement that can obtained with other driving systems, like for example solenoid actuators.

The configuration of the stopping unit 5 described above, in which the movement of the pressor elements takes place orthogonally to the supporting plate 4, ensures that the tank 3 is locked so as to rest perfectly on the supporting plate 4.

This aspect is particularly advantageous for stereolithography machines of the type described herein, in which the liquid substance is solidified at the level of the layer adjacent to the bottom 3a of the tank 3.

In fact, resting the tank 3 on the surface of the supporting plate 4 ensures the precise positioning of its bottom 3a with respect to the modelling plate 29 and, therefore, allows solidified layers with uniform thickness to be obtained.

Furthermore, when the stereolithography machine 1 uses a laser beam for stimulation, the beam is focused at a very precise and extremely reduced distance from the bottom 3a of the tank 3 and, therefore, the precise positioning of the bottom 3a is crucial to obtain good processing results.

It is also evident that, in variant embodiments of the invention, the stopping unit 5 may have any configuration different from the one described above, provided that it is suited to obtain the locking and release of the tank 3 to/from the supporting plate 4.

In particular, the number, arrangement and sliding direction of the pressor elements 18 may be different from those described above.

Preferably, each pressor element 18 comprises two branches 20, 21, visible in greater detail in FIG. 5, that extend on opposite sides of the supporting body 19 and parallel to the supporting plate 4.

The branches 20, 21 are provided with respective contact bodies 20a, 21a configured so that they are respectively arranged against the tank 3 and a reference surface 24 belonging to the supporting plate 4 when the pressor element 18 is arranged in the active position.

The presence of the two branches 20 and 21 makes it possible to balance the stresses to which the supporting body 19 is subjected during the compression of the tank 3, with the advantage of generating bending moments on the guides of the supporting body 19 and thus increasing the duration of the guides.

The supporting plate 4 preferably but not necessarily comprises a lifting unit 25 configured so as to lift the tank 3 with respect to the supporting plate 4.

Advantageously, the lifting unit 25 prevents the bottom 3a of the tank 3 from rubbing against the surface of the supporting plate 4 during movement.

Preferably, and as shown in FIG. 2, the lifting unit 25 comprises one pair of moving elements 26, each one of which is arranged inside a corresponding seat 27 obtained in the supporting plate 4.

In the detail of FIG. 4 it is possible to observe that each moving element 26 is associated with elastic means 28 capable of causing the moving element 26 to be spontaneously lifted past the surface of the supporting plate 4.

Obviously, the elastic means 28 are configured so as to be able to lift the tank 3 together with the liquid substance contained therein.

Each moving element 26 preferably comprises a bar 34 provided with through holes 35 slidingly associated with corresponding pins 36 in the supporting plate 4.

Each pin 36 is provided with an enlarged head 36a that defines the end of stroke for the lifting movement of the corresponding bar 34.

The bar 34 is shorter compared to the height of the seat 27 so that, when the tank 3 is lowered, the bar 34 is thrust inside the corresponding seat 27 so as to allow the tank 3 to rest on the surface of the supporting plate 4.

Operatively, the tank 3 is coupled with the supporting plate 4 making it slide under the pressor elements 18 according to the first direction of movement X and with the contact element 10 lifted, until the tank comes into contact with the other contact element 9.

It is then possible to lower the first contact element 9 making it rotate around the corresponding pin, thus reaching the configuration shown in FIG. 1.

During coupling of the tank 3, the lifting unit 25 keeps the tank 3 lifted with respect to the surface of the supporting plate 4, as shown in FIG. 3.

Before each layer of the three-dimensional object is processed, the tank 3 is locked by arranging the pressor elements 18 in the active position shown in FIG. 8.

In this way, the tank 3 is compressed against the surface of the supporting plate 4 in order to lock it and prevent it from being lifted, which would be caused by the suction effect previously described, and also to prevent any movement parallel to the supporting plate, which may affect the soundness of the layer being processed.

Once the layer of the three-dimensional object has been completed, the stopping unit 5 releases the tank 3 that is consequently lifted by the lifting unit 25.

Successively, the holding unit 7 moves the tank 3 in the first direction of movement X in order to modify its position with respect to the through opening 4a of the supporting plate 4, which defines the area of exposure to the electromagnetic radiation 6a.

During movement, the guide means 13 maintain the tank 3 correctly aligned with respect to the supporting plate 4, acting on opposing walls of the tank 3.

Preferably, the holding unit 7, the stopping unit 5, the emitter means 6 and the modelling plate 29 are all controlled by means of a single logic control unit that coordinates their action, not illustrated herein but known per se.

The above clearly shows that the stereolithography machine described above achieves all the objects of the invention.

In particular, the possibility to move the tank during the processing of the three-dimensional object makes it possible to expose different areas of the bottom of the tank to the electromagnetic radiation.

Consequently, the effect following to which the tank becomes opaque is distributed on a bottom whose surface is larger than in the stereolithography machines of known type, which increases the duration of the tank.

The longer duration of the tank furthermore makes it possible to produce three-dimensional objects consisting of a larger number of layers, and therefore higher than those obtainable with machines of known type.

Furthermore, the locking of the tank obtained by resting it on the supporting plate ensures the perfect stability of the tank during the formation of each layer of the object.

The possibility to separate the tank from the supporting plate furthermore allows it to be easily removed in case of replacement, with no need to disassemble a part of the machine.

On implementation, the stereolithography machine that is the subject of the invention may undergo further changes that, though neither illustrated in the drawings nor described herein, shad nonetheless be covered by the present patent, provided that they come within the scope of the claims that follow.

Where technical features mentioned in any claim are followed by reference signs, those reference sings have been included for the sole purpose of increasing the intelligibility of the claims and accordingly such reference signs do not have any limiting effect on the protection of each element identified by way of example by such reference signs.

I claim:

1. Stereolithography machine comprising:
    a supporting frame;
    a tank suited to contain a liquid substance, comprising a bottom delimited by side walls;
    a supporting plate associated with said supporting frame, suited to sustain said tank;
    a stopping unit suited to firmly hold said tank on said supporting plate in at least one locked position;
    emitter means suited to direct a predefined electromagnetic radiation towards said tank when it is arranged in said locked position;
    a holding unit of said tank, operatively associated with said supporting plate through first actuator means configured so as to move said tank in a plane parallel to said supporting plate according to a predefined trajectory of movement,
    wherein said bottom of said tank is transparent to said electromagnetic radiation;
    wherein said stopping unit comprises second actuator means that define for said stopping unit an active configuration for holding said tank in said locked position and a rest configuration for releasing said tank from said locked position.

2. Stereolithography machine according to claim 1, wherein said trajectory of movement comprises a translation movement of said tank according to at least one first direction of movement.

3. Stereolithography machine according to claim 2, wherein said trajectory of movement comprises a translation movement of said tank according to a second direction of movement incident on said first direction of movement.

4. Stereolithography machine according to claim 2, wherein said holding unit comprises two opposing contact elements, each suited to be arranged against a corresponding side wall of said tank when said tank is arranged in said locked position.

5. Stereolithography machine according to claim 4, wherein said contact elements are associated with the corresponding ends of a rod slidingly connected to said supporting frame according to said first direction of movement.

6. Stereolithography machine according to claim 5, wherein said first actuator means comprise a motor operatively associated with said rod through a rack gear.

7. Stereolithography machine according to claim 2, wherein said supporting plate comprises guide means suited to counteract the movement of said tank in a guide direction parallel to said supporting plate and orthogonal to said first direction of movement.

8. Stereolithography machine according to claim 7, wherein said guide means comprise a counteracting body movably associated with said supporting plate through elastic means acting according to said guide direction in order to maintain said counteracting body against a side wall of said tank.

9. Stereolithography machine according to claim 1, wherein said stopping unit comprises at least one pressor element facing said tank and slidingly associated with said supporting plate, and a counteracting surface associated with said supporting plate, said pressor element and said counteracting surface being suited to cooperate on corresponding opposing surfaces of said tank so as to hold it.

10. Stereolithography machine according to claim 9, wherein said pressor element comprises a supporting body developed orthogonally to said supporting plate and wherein said second actuator means comprise a sliding block that is motor-driven in a direction parallel to said supporting plate, provided with a surface that is inclined with respect to said supporting plate and slidingly associated with said supporting body.

11. Stereolithography machine according to claim 10, wherein said pressor element comprises two branches extending on opposing sides of said supporting body and parallel to said supporting plate, configured so as to be respectively arranged against said tank and a reference surface of said supporting plate when said pressor element is arranged in said active configuration.

12. Stereolithography machine according to claim 1, wherein said supporting plate comprises a lifting unit suited to lift said tank with respect to said supporting plate.

13. Stereolithography machine according to claim 12, wherein said lifting unit comprises at least one moving element arranged inside a corresponding seat belonging to said supporting plate and associated with elastic means suited to cause said moving element to be spontaneously lifted past the surface of said supporting plate.

14. Stereolithography machine according to claim 1, wherein said supporting plate has a through opening that faces said bottom at least when said tank is arranged in said locked position.

15. Stereolithography machine according to claim 1, wherein it comprises a modelling plate facing said supporting plate and associated with said supporting frame through power means suited to define for said modelling plate a direction of movement orthogonal to said supporting plate.

\* \* \* \* \*